Oct. 22, 1968  E. C. MERSEREAU  3,406,794
BRAKE MECHANISM
Filed Sept. 6, 1966  3 Sheets-Sheet 1
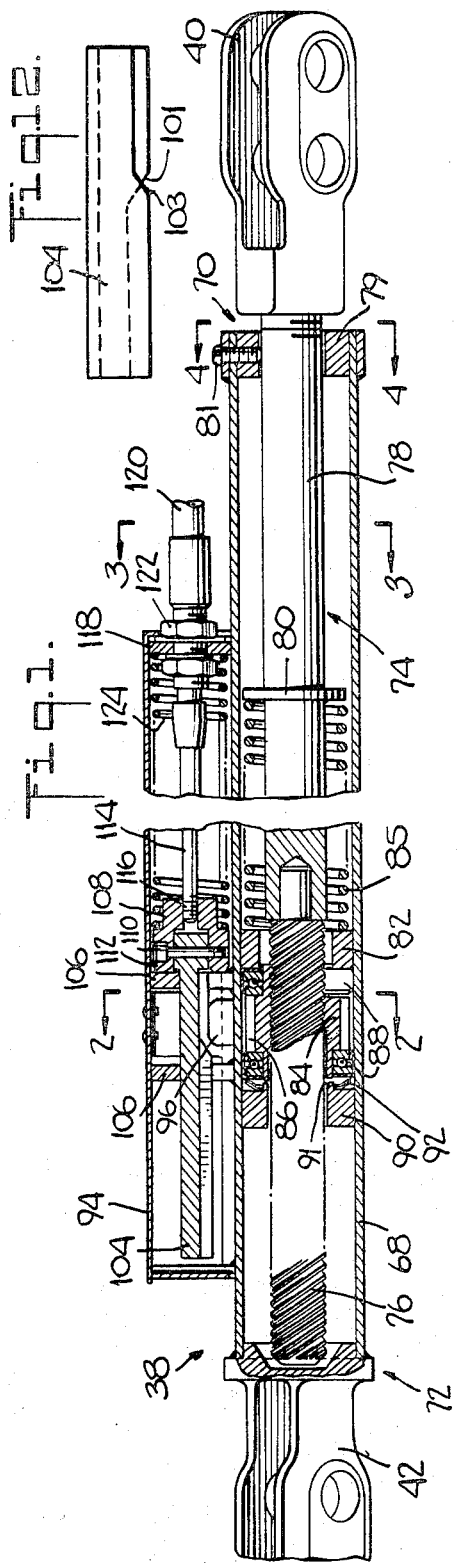
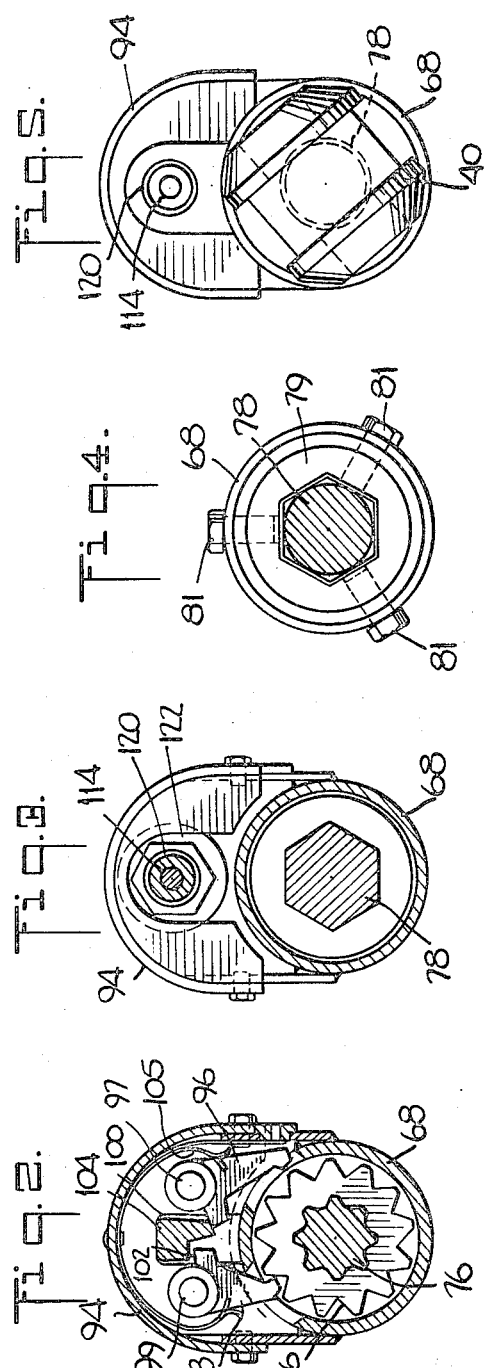
INVENTOR.
EVERARD C. MERSEREAU
BY
ATTORNEYS

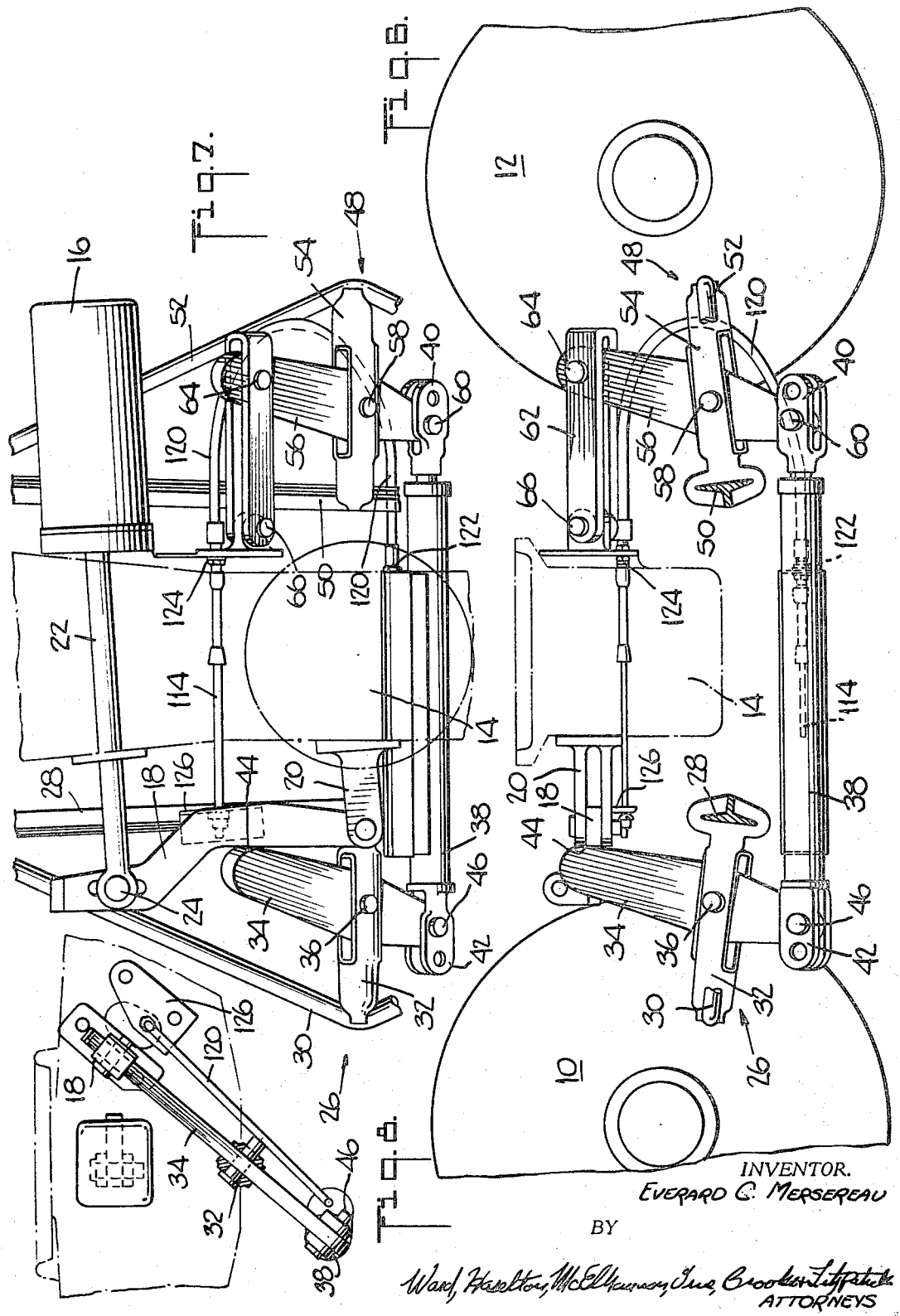

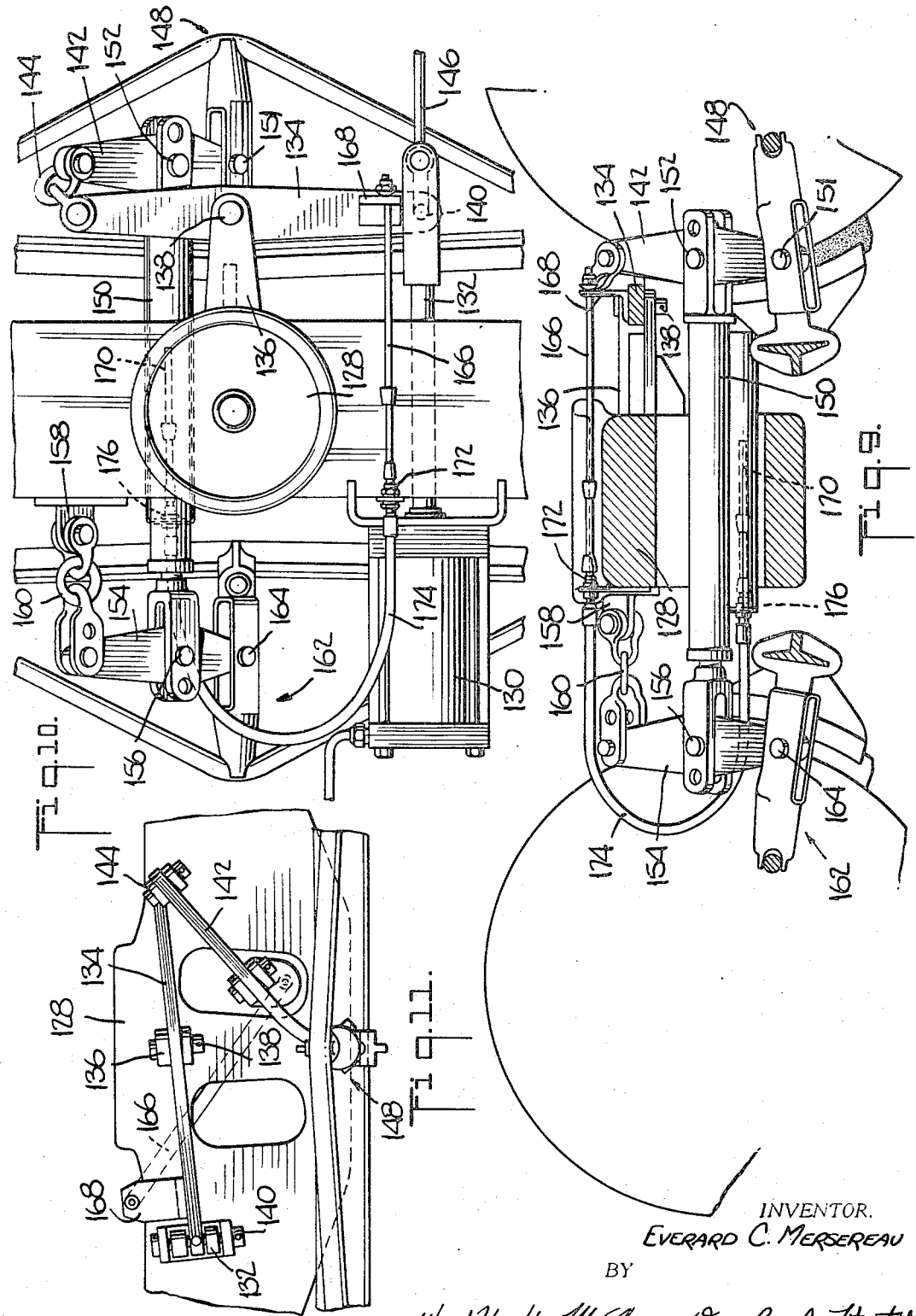

United States Patent Office 3,406,794
Patented Oct. 22, 1968

3,406,794
BRAKE MECHANISM
Everard C. Mersereau, Wayne, N.J., assignor, by mesne assignments, to Robert M. Holloway and Robert L. Ludington, both of Michigan City, Ind.
Filed Sept. 6, 1966, Ser. No. 577,481
14 Claims. (Cl. 188—195)

ABSTRACT OF THE DISCLOSURE

A fluid actuated railway car brake mechanism including in combination, a brake beam having portions which are frictionally engageable with the wheels, a truck lever pivotally mounted on the brake beam, slack adjusting means connected to one end of said truck lever, a trigger cable having one end attached to a cylinder lever and the other end attached to the slack adjusting means for actuating the slack adjusting means in response to movement of the truck lever.

---

This invention has to do with brake mechanisms, and more particularly, double acting brake mechanisms for standard railway cars.

The brake mechanism according to this invention is particularly adapted for use in all standard railway car trucks such as are now widely in use on American, Mexican and Canadian railways. The brake mechanism according to this invention may be used as new or original equipment on the railway cars, or it may be used as replacements or attachments to brake mechanisms presently in operation.

In brief, the present invention comprises the provision of a brake mechanism for a railway car having a truck carrying a pair of wheels, which mechanism comprises a frame member, a piston cylinder assembly mounted on the frame member, and a piston rod actuated by the piston cylinder assembly. A cylinder lever is provided having one end pivotally mounted on the frame member and the other end thereof pivotally mounted on the piston rod. A brake beam is employed having portions which are selectively brought into frictional engagement with the pair of wheels. A truck lever is pivotally mounted on the brake beam, and slack adjusting means are employed which are extensible and retractable for eliminating the slack and controlling the travel of the brake mechanism, said slack adjusting means being lockable in a rigid condition when transmitting the full braking force to the brake beam. The truck lever slidably engages the cylinder lever and is pivotally connected to the slack adjusting means. The mechanism further comprises trigger means interconnecting the cylinder lever and the slack adjusting means for actuating said slack adjusting means in response to movement of the cylinder lever.

In one aspect of the invention, the slack adjusting device comprises a housing having first and second ends, a push rod assembly having a threaded portion and having a circumferential shoulder. An adjusting nut is provided threadably mounted on the threaded portion of the push rod and has teeth on the circumference thereof. Bearing means including bearing retainers are provided for mounting the adjusting nut within the housing for rotation. A spring is disposed within the housing and acts between the circumferential shoulder and the bearing retainer means. The adjusting nut engages the bearing retainer means when an axial force is applied to the slack adjusting means and it is in its rigid condition. A load pawl and a holding pawl are mounted in the housing adjacent the teeth and engageable respectively with opposite sides of the teeth for respectively preventing movement of the rod assembly in opposite directions. It will be appreciated that a cam bar is provided and a cam bar hub is connected to the cam bar, the cam bar hub having a circumferential shoulder. A trigger cable is threadably connected to the cam bar hub and the cable extends through an opening in the end of the housing. The cable is adapted for longitudinal movement with respect to the housing. The cam bar is U-shaped and the end of the arms are cam surfaces, respectively. These surfaces are engageable with the pawl cam engaging portions, respectively, for disengaging the teeth engaging portions of the pawls from said teeth. The cam surfaces and the cam engaging portions are disposed with respect to said pawls so that in a first longitudinal position of the cam bar the load pawl is out of engagement with the teeth and the holding pawl is in engagement with one of the teeth, and in a second longitudinal position of the cam bar the load pawl is in engagement with one of the teeth and the holding pawl is out of engagement with the teeth. Further, spring means are provided in the housing acting between the circumferential shoulder of the cam bar hub and an end flange in the housing for urging the cam bar away from the first end of the housing.

Heretofore slack adjusters were disposed under a railway car and extended between the two trucks of the car. Difficulty was experienced due to the fact that frequently railway cars such as hopper cars were subjected to heat under the central portion thereof for purposes of thawing the cargo so that it could be discharged from the car. In practice all types of heaters, some of which are quite crude in form, are employed for heating these cars, and hence in many instances the central portion of the cars were extremely overheated and the braking mechanism were subjected to irreparable damage. According to the present invention the brake mechanism is employed under each truck of the car only.

When using the prior art devices, it was necessary to jack up the entire railway car in order to remove the brake mechanism for purposes of repairs or replacement. A feature of the present invention is to simplify the procedure for removing and repairing or replacing brake mechanisms.

In recent years it has been the custom of railway car manufacturers to increase the size of the various cars, such as tank and hopper cars, thereby eliminating the space under the car body for purposes of increasing the cargo capacity. Another feature of this invention is the provision of new and improved brake mechanisms for such newly designed railway cars.

It is an aim of the present invention to provide a new and improved brake mechanism which is reliable, compact, low in weight, convenient, durable, practical, safe in operation and economical.

Other objects and advantages reside in the details of construction and operation, as more fully hereinafter described and claimed, reference being had to the accompanying drawings forming part hereof, wherein like numerals refer to like parts throughout, and in which:

FIG. 1 is a medial sectional view showing details of the slack adjuster constructed according to this invention;

FIG. 2 is a transverse sectional view taken along the line 2—2 of FIG. 1;

FIG. 3 is a transverse sectional view taken along the line 3—3 of FIG. 1;

FIG. 4 is a transverse sectional view taken along the line 4—4 of FIG. 1;

FIG. 5 is an end view of the slack adjuster of the invention;

FIG. 6 is a side elevation, drawn on a reduced scale, of the braking mechanism of the invention as applied to a railway car truck;

FIG. 7 is a fragmentary plan view of the brake mechanism of FIG. 6;

FIG. 8 is a fragmentary end elevation of the right hand end of the mechanism of FIG. 7;

FIG. 9 is a side elevation drawn to reduced scale, of another embodiment of the brake mechanism of this invention;

FIG. 10 is a fragmentary plan view of the embodiment of the invention of FIG. 9;

FIG. 11 is a fragmentary end elevation of the right hand end of the mechanism as viewed in FIG. 10; and FIG. 12 is a detailed longitudinal enlarged view of the cam bar showing the cam surfaces.

In the embodiment of the invention illustrated in FIGS. 6–8, the mechanism comprises a first pair of wheels 10, and a second pair of wheels 12 respectively, only one wheel of each pair being shown in FIG. 6, one other wheel of each pair being identical. A frame 14 is provided and a piston cylinder assembly 16 is mounted on the frame member. A first substantially horizontally disposed cylinder lever 18 has one end pivotally mounted on a supporting member 20 which is fixedly mounted on the frame member 14. The other end of the cylinder lever 18 is pivotally connected to a piston rod 22 extending from the piston cylinder assembly 16 as at 24. A first brake beam indicated generally at 26 has a brake beam cross member 28, a pair of arms 30, and a medial strut 32. For braking purposes, portions of the brake beam are selectively brought into frictional engagement with the first pair of wheels in a conventional manner. A brake live lever 34 is centrally pivotally mounted on the medial strut 32 of the brake beam as at 36.

As best seen in FIGS. 6 and 7, slack adjusting means 38 are provided which are extensible and retractable for eliminating the slack and controlling the travel of the brake mechanism, the slack adjusting means being lockable in a rigid condition when transmitting the full brake force between the brake beams. The slack adjuster 38 is provided with a yoke 40 at the first end thereof and a yoke 42 at the second end thereof.

As best seen in FIGS. 6 and 7, one end of the brake live lever 34 slideably engages the cylinder lever 18 at a contact point 44 and the other end of the truck live lever is pivotally connected to the second end of the slack adjusting means as by means of pin 46.

A second brake beam indicated generally at 48, is provided for the second pair of wheels 12. This brake beam includes a brake beam cross member 50, a pair of arms 52 and a medial strut 54. Portions of this brake beam are selectively brought into frictional engagement with the second pair of wheels similarly to the first brake beam 26. A truck dead lever 56 is medially pinned to the strut 54 as by means of pin 58. One end of the truck dead lever is pivotally attached to the yoke 40 of the first end of the slack adjuster 38 as at 60, and the other end of the truck dead lever is pivotally attached to a support member 62 as by pin 64, the support member being pivotally connected to the frame 14 as by means of pin 66.

As best seen in FIG. 1, the slack adjusting device 38 includes a housing 68 having a first end indicated generally at 70 and a second end indicated generally at 72. A push rod assembly indicated generally at 74 has a threaded portion 76, FIG. 2, a coupling portion 78, FIG. 3, as well as a yoke portion 40, FIG. 5. All of these portions are fixedly interconnected one with respect to the next adjacent one, as shown, the threaded portion and the coupling portion being disposed within the housing and the yoke portion extending from the first end of the housing. The coupling portion 78 of the push rod assembly is mounted in the housing 68 by means of an end bushing 79, FIGS. 1 and 4, held by cap screws 81. The coupling portion has a shoulder 80, FIG. 1. The housing 68 is provided with a combination bearing sleeve and internal circumferential shoulder 82, and a spring 85 is disposed within the housing and acts between the shoulders 80 and 82 urging the threaded portion 76 toward the first end of the housing, or to the right as viewed in FIG. 1.

An adjusting nut 84 is threadably connected to the threaded portions of the push rod and is provided with teeth 86 on the circumference thereof. The adjusting nut is mounted in the housing 68 on bearings 88 which are retained in axial position by a bearing sleeve 82 and a bearing retainer 90, spring means 92 being employed as shown for urging the adjusting nut to the right as viewed in FIG. 1. It will be appreciated that the adjusting nut 84 is movable toward the second end of the housing when an axial force is exerted thereon in the direction from the first end of the housing towards the second end of the housing, and the bearing sleeve 90 serves to limit such axial travel.

As best seen in FIGS. 1–5, the housing has an upper bubble-like protrusion or pawl box 94 for encasing the cam and pawl mechanism. A load pawl 96, FIG. 2, and a holding pawl 98 are pivotally mounted on axles 97 and 99, respectively, in the housing adjacent the teeth 86 and engageable respectively with opposite sides of the teeth for preventing movement of the piston rod assembly 74 in opposite directions, the loading pawl 96 is provided with a cam engaging surface 100 and the holding pawl is provided with a cam engaging surface 102. A cam bar 104 is longitudinally movably mounted on the abutments 106 within the housing.

As best seen in FIG. 12, the cam bar 104 is provided with a cam surface 101 and a cam surface 103, cam surface 101 being adapted to engage cam engaging surface 100 of pawl 96 (FIG. 2) and cam surface 103 being adapted to engage cam engaging surface 102 of holding pawl 98 for purposes of actuating the pawls, respectively.

A cam bar hub 108 is fixedly attached to the cam bar by means of pin 110 provided for the purpose. The cam bar hub is provided with a circumferential shoulder 112, FIG. 1, one side of which engages the abutment 106 to limit the travel of the cam bar in one direction.

Still referring to FIG. 1, one end of a bearing cable 114 is attached to the cam bar hub 108 as at 116. A pawl box 94 is provided with an end flange 118 having an opening therein through which the trigger cable passes. Outside the pawl box, the cable is covered and protected by a cable casing 120, and a cable casing coupling 122 connects the cable casing to the pawl box so that the trigger cable itself is free to move with respect to the cable casing for actuating the cam bar. A spring 124 acts between one side of the shoulder 112 and the end flange 118 to urge the cam bar hub towards the second end of the housing 68 or to the left as viewed in FIG. 1.

As best seen in FIGS. 6 and 7, the other end of the trigger cable casing 120 passes around in an arc and is connected to the frame 14 as by means of cable casing coupling 124. This coupling restricts movement of the cable casing and allows movement of the cable itself. The end of the cable is connected to a bracket 126 mounted on the cylinder lever 18 so that movement of the cylinder lever causes the trigger cable to move the cam bar 104, accordingly.

In operation when the brakes are released, that is, when the piston rod 22 is in its retracted position, the load pawl 96 (FIG. 2) is in its disengaging position and the holding pawl 98 is in its engaged position. As fluid or air under pressure is supplied to the cylinder 16, the piston rod 22 moves to the left, as viewed in FIG. 7, and at some point in the movement, the cylinder lever 18 engages the truck live lever 34. As the brakes are further applied, and hence as the piston rod 22 moves further to the left as viewed in FIG. 7, the cable 114 is moved to the left as viewed in FIG. 7 and to the right as viewed in FIG. 1 with respect to the housing 68, thereby compressing the spring 124 and causing the cam bar 104 to move to the right as viewed in FIG. 1. At an intermediate stage in the application of the brakes, the cam bar 104 (FIG. 1)

will have moved to the right, as viewed in FIG. 1 to a position wherein the cam surfaces 101 and 103 both will be engaging cam engaging surfaces 100 and 102 of pawls 96 and 98, respectively, and thereby lift the pawls 96 and 98 out of engagement with the teeth of the adjusting nut 84. At this time, namely, when both pawls are disengaged from the adjusting nut 84, if there is slack in the brake riggings, the push rod assembly 74 will move to the right with respect to the housing 68 under the pressure of the spring 85, FIG. 1, the nut 84 being free to rotate within the housing, thereby lengthening the overall length of the slack adjusting device to pick up the slack in the rigging. When the brakes are still further applied, and hence when the piston rod 22, FIG. 7, moves further to the left, the trigger cable 114, FIG. 1, moves the cam bar 104 further to the right. In this position, the cam surface 103, while engaging the cam engaging surface 102 of the holding pawl 98, disengages the holding pawl 98 from the teeth 86 of the adjusting nut 84. The cam surface 101, acting through the cam engaging surface 100 will lower the load pawl 96, allowing the load pawl 96 to rotate slightly in a clockwise direction due to the force of the spring 105 so that the load pawl 96 will engage the teeth 86 of the adjusting nut 84, and hence the adjusting nut 84 will be locked in position. When a fuller load is imposed on the unit, the piston assembly moves the nut 84 and its bearings 88 to the left with respect to the housing 68 (as viewed in FIG. 1), compressing the spring 92 until the abutment 91 comes into contact with the left end of the adjusting nut 84, thereby locking the adjusting device in a rigid position for braking. In the brake setting position, the forces imposed by the brake operation follow a course extending through the tubular housing 68, bearing retainer 90, adjusting nut 84, threaded portion 76 to the remainder of the push rod assembly 74. Thus, the braking forces imposed extend from the piston rod 22, through the cylinder lever 18, through the truck live lever 34 which urges the brake beam 26 outwardly as viewed in FIG. 7 to apply the brakes while the slack adjuster is urged to the right. This tends to pivot the truck dead lever 56 about pin 64 of the fixed support 62, and thereby urges brake beam 48 outwardly to apply the second set of brakes. Accordingly, it is seen that during the braking operation the slack adjuster is under compression.

When the brakes are released, the cycle of operation described above is repeated in the reverse order so that the parts return to their original positions. That is, the load pawl 96 becomes disengaged from the teeth 86 of the adjusting nut 84, and the holding pawl 98 becomes engaged with the teeth 86 of the adjusting nut 84.

After the brake shoes have been replaced because they were worn out, and the fluid has been supplied to the fluid cylinder 16, the piston rod 22 moves to the left as viewed in FIG. 7, thereby urging the brake shoes (not shown) against the wheels before the slack is taken out of the trigger cable 114 (before the trigger cable moves the cam bar). Since the holding pawl 98 is in engagement with the teeth 86 of the adjusting nut 84, and the load pawl 96 is disengaged from the same adjusting nut teeth, the force supplied to the push rod assembly 74 pushes the threaded portion 76 thereof to the left as viewed in FIG. 1, at the same time compressing spring 85. This causes the adjusting nut 84 to rotate in a counterclockwise direction as viewed in FIG. 2, thereby ratcheting under the pawl 98, which is free to rotate outwardly away from the teeth at all times, against the smaller force of the spring 105. This action takes place until the trigger cable 114 takes up slack and moves the cam bar 104 sufficiently to the right as viewed in FIG. 1 to seat the load pawl 96 in the teeth 86 of the nut 84, thereby locking the adjusting nut in its brake setting position, and the brakes are applied in the manner aforementioned.

In another form of the invention, as best seen in FIGS. 9, 10 and 11, the brake mechanism comprises a frame 128, an air cylinder and piston assembly 130 mounted on the frame, and a piston rod 132 extending from the cylinder. A substantially horizontally disposed cylinder lever 134 is centrally pivotally mounted on the support member 136 as by means of pin 138, the support member 136 being fixedly mounted on the frame 128. One end of the cylinder lever 134 is pivotally attached to the piston rod 132 as at 140 and the other end thereof is connected to one end of a truck live lever 142 as by means of shackle 144. A handbrake rod 146 is connected to the horizontal live cylinder 134, as shown in FIG. 10, for purposes of operating the brakes by hand. The other end of the truck live lever is pivotally attached to a first brake beam 148 as by means of pin 151, brake beam 148 being constructed and operated in a manner similar to that described hereinbefore in connection with brake beam 26 of FIGS. 6 and 7.

Still referring to the embodiment of FIGS. 9 and 10, the truck live lever 142 is centrally pivotally mounted on one end of a slack adjuster 150, as by means of pin 152 provided for the purpose. Slack adjuster 150 is constructed and operates the same as slack adjuster 38 described hereinbefore. However, it is noted that slack adjuster 150 passes through the frame or bolster 128 (FIG. 9) whereas slack adjuster 38 passes under the frame or bolster 14 (FIG. 6).

As best seen in FIGS. 9 and 10, a truck dead lever 154 is medially pivotally attached to the other end of the slack adjuster 150 as by means of pin 156. A support 158 is fixedly attached to the frame 128 and one end of the truck dead lever 154 is connected thereto by means of shackle 160, and the other end of the truck dead lever 154 is pivotally connected to a second brake beam 162 as by means of pin 164. The second brake beam 162 is constructed and operates like the brake beam 148 described hereinbefore.

A trigger cable 166 is provided for purposes of actuating the slack adjuster 150. One end of this cable is connected to bracket 168 mounted on the horizontal cylinder live lever 134, and the other end of the cable is connected to the slack adjuster as at 170. A coupling member 172 connects the trigger cable casing 174 to the frame 128 and coupling member 176 connects the casing to the slack adjuster 150.

In operation the slack is removed from the brake rigging in the same manner as that described in connection with the embodiment of FIGS. 6, 7 and 8. After the brakes have been applied and the slack adjuster 150 is in its rigid position, the brake forces imposed extend from the piston rod 132, through the cylinder lever 134, through the truck live lever 142 which urges the slack adjuster 150 to the left as viewed in FIG. 10 and urges the brake beam 148 to the right as viewed in FIG. 10 to apply the brakes. This movement of the slack adjuster urges the truck dead lever 154 to pivot about its support 158 and move the second brake beam 162 to the left as viewed in FIG. 10, thereby applying the second pair of brakes. It is again seen that during brake operation the slack adjuster is under compression.

When the brakes are released, the cycle of operation described above is repeated in the reverse order so that the parts return to their original positions.

It will be appreciated that the slack adjusters 38 and 150 are, in effect, double acting devices and serve to maintain the travel of the piston rods 22 (FIG. 7) and 132 (FIG. 10) at preselected amounts automatically, respectively, and hence the braking forces are uniformly applied in each car of a series of cars. Thus, the possibility of some cars being held back while other cars roll ahead is substantially eliminated.

In view of the foregoing description, taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though we have herein shown and described several preferred embodiments of the invention, the same are susceptible to certain changes fully comprehended by the spirit of the invention as herein described and scope of the appended claims.

Having thus described the invention, what I claim is:

1. A brake mechanism for a railway car having a truck carrying a pair of wheels, said mechanism comprising a frame member, a piston cylinder assembly mounted on said frame member, a piston rod actuated by said piston cylinder assembly, a cylinder lever having one end pivotally mounted on said frame member and the other end thereof pivotally mounted on said piston rod, a brake beam having portions which are selectively brought into frictional engagement with said pair of wheels, a truck lever pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, said truck lever slideably engaging said cylinder lever and being pivotally connected to the slack adjusting means, and trigger means interconnecting said cylinder and said slack adjusting means for actuating said slack adjusting means in response to movement of said cylinder, said trigger means including a cable having one end attached to said cylinder lever and the other end attached to said slack adjusting means.

2. A brake mechanism for a railway car according to claim 1 further comprising a second pair of wheels, a second brake beam having portions which are selectively brought into frictional engagement with said second pair of wheels, said slack adjusting means operatively connecting said first brake beam with said second brake beam.

3. A brake mechanism for a railway car according to claim 1 further comprising a second pair of wheels, and wherein said truck live lever is centrally pivotally mounted on said brake beam, said slack adjusting means having a first end and a second end, one end of said truck live lever slideably engaging said cylinder lever and the other end of the truck live lever being pivotally connected to the second end of the slack adjusting means, said mechanism further comprising a second brake beam having portions which are selectively brought into frictional engagement with said second pair of wheels, a truck dead lever centrally pivotally mounted on said second brake beam, said truck dead lever having one end pivotally connected to the first end of said slack adjusting means, and having the other end thereof pivotally mounted on said frame member.

4. A brake mechanism for a railway car according to claim 2 wherein said slack adjusting device comprises a housing having first and second ends, a push rod assembly having a threaded portion, an adjusting nut threadably mounted on said threaded portion of said push rod and being provided with teeth on the circumference thereof; means mounting said adjusting nut within the housing for rotation, a load pawl and a holding pawl mounted in said housing adjacent said teeth and engageable respectively with opposite sides of the teeth for respectively preventing movement of said push rod assembly in opposite directions, resilient means engaging said pawls for moving said pawls into engagement with said teeth, a cam bar longitudinally movably mounted within the housing, the cam bar having cam surfaces engageable with said pawls respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and said holding pawl is in engagement with one of said teeth, in a second longitudinal position of the cam bar said load pawl is in engagement with one of said teeth and said holding pawl is out of engagement with said teeth; and wherein said other end of said trigger cable is connected to said cam bar.

5. A brake mechanism for a railway car according to claim 3 wherein said slack adjusting device comprises a housing having first and second ends; a push rod assembly having a threaded portion, a coupling portion having a circumferential shoulder, and a yoke portion, said portions being fixedly interconnected one with respect to the next adjacent one, and said threaded portion and said coupling portion being disposed within said housing and said yoke portion extending from said first end of the housing, said housing having an internal circumferential shoulder; spring means disposed within the housing and acting between the housing shoulder and the coupling portion shoulder of said push rod assembly for urging said threaded portion toward said first end of the housing; an adjusting nut threadably mounted on the threaded portion of said push rod and being provided with teeth on the circumference thereof; bearing means mounting said adjusting nut within the housing for rotation; bearing retainer means for said bearing means, resilient means for resiliently separating said adjusting nut and said retainer means, said adjusting nut engaging said bearing retainer means when an axial force is applied, in opposition to said resilient means, to said slack adjusting means and it is in its rigid condition, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth, a cam bar longitudinally movably mounted within the housing, a cam bar hub for engaging an abutment disposed within the housing for preventing excessive movement in a direction away from said one end of said housing, said cam bar hub being pinned to said cam bar, said cam bar hub having a circumferential shoulder, said other end of the trigger cable being threadably connected to said cam bar hub, said cable extending through an opening in the end of the housing and being adapted for longitudinal movement with respect to said housing, an end flange mounted on said housing adjacent said opening, a cable casing protecting said cable outside of said housing, a cable casing coupling attaching said cable casing to said end flange adjacent said opening, and spring means disposed within the housing and acting between the cam bar hub shoulder and the end flange for urging the cam bar hub towards the second end of said housing.

6. A brake mechanism for a railway car having a truck carrying a pair of wheels, said mechanism comprising a frame member, a piston cylinder assembly mounted on said frame member, a piston rod actuated by said piston cylinder assembly, a cylinder lever centrally pivotally mounted on said frame member and having one end pivotally mounted on said piston rod, a brake beam having portions which are selectively brought into frictional engagement with said pair of wheels, a truck live lever having one end pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, said truck lever having the other end operatively connected to the other end of said cylinder lever and being centrally pivotally connected to the slack adjusting means, and a trigger cable having one end attached to said cylinder lever and the other end attached to said slack adjusting means for actuating said slack adjusting means in response to movement of said cylinder lever.

7. A brake mechanism for a railway car according to claim 6 further comprising a second pair of wheels, a second brake beam having portions which are selectively brought into frictional engagement with said second pair of wheels, said slack adjusting means operatively connecting said first brake beam with said second brake beam.

8. A brake mechanism for a railway car according to claim 6 further comprising a second pair of wheels, and wherein one end of said truck live lever is pivotally mounted on said brake beam, said slack adjusting means having a first end and a second end, shackle means connecting the other end of said truck live lever to said cylinder lever and the truck live lever being centrally pivotally connected to the second end of the slack adjusting means, said mechanism further comprising a second brake beam having portions which are selectively brought into frictional engagement with said second pair of wheels, a truck dead lever centrally pivotally mounted on the first end of the slack adjusting means, said truck dead lever having one end pivotally connected to the second brake beam, and shackle means for connecting the other end thereof to said frame member.

9. A brake mechanism for a railway car according to claim 6 further comprising a second pair of wheels, a second brake beam having portions which are selectively brought into frictional engagement with said second pair of wheels, said slack adjusting means operatively connecting said first brake beam with said second brake beam, and wherein said slack adjusting device comprises a housing having first and second ends, a push rod assembly having a threaded portion, an adjusting nut threadably mounted on said threaded portion of the push rod and being provided with teeth on the circumference thereof; means mounting said adjusting nut within the housing for rotation, resilient means for resiliently separating said adjusting nut and said retainer means, said adjusting nut engaging said bearing retainer means when an axial force is applied, in opposition to said resilient means, to said slack adjusting means and it is in its rigid condition, a load pawl and a holdng pawl mounted in said housing adjacent said teeth and engageable respectively with opposite sides of the teeth for respectively preventing movement of said push rod assembly in opposite directions, means engaging said pawls for moving said pawls into engagement with said teeth, a cam bar longitudinally movably mounted within the housing, the cam bar having cam surfaces engageable with said pawls respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and said holding pawl is in engagement with one of said teeth, in a second longitudinal position of the cam bar said load pawl is in engagement with one of said teeth and said holding pawl is out of engagement with said teeth; and wherein said other end of said trigger cable is connected to said cam bar.

10. A brake mechanism for a railway car according to claim 6 further comprising a second pair of wheels, and wherein one end of said truck live lever is pivotally mounted on said brake beam, said slack adjusting means having a first end and a second end, shackle means connecting the other end of said truck live lever to said first mentioned cylinder lever, and the truck live lever being centrally pivotally connected to the second end of the slack adjusting means, said mechanism further comprising a second brake beam having portions which are selectively brought into frictional engagement with said second pair of wheels, a truck dead lever centrally pivotally mounted on the first end of the slack adjusting means, said truck dead lever having one end pivotally connected to the second brake beam, and shackle means for connecting the other end thereof to said frame member, and wherein said slack adjusting device comprises a housing having first and second ends; a push rod assembly having a threaded portion, a coupling portion having a circumferential shoulder and a yoke portion, said portions being fixedly interconnected one with respect to the next adjacent one, and said threaded portion and said coupling portion being disposed within said housing and said yoke portion extending from said first end of the housing, said housing having an internal circumferential shoulder; spring means disposed within the housing and acting between the housing shoulder and the coupling portion shoulder of said push rod assembly for urging said threaded portion towards said first end of the housing; an adjusting nut threadably mounted on the threaded portion of said push rod and being provided with teeth on the circumference thereof; bearing means mounting said adjusting nut within the housing for rotation, bearing retainer means for said bearing means, resilient means for resiliently separating said adjusting nut and said retainer means, said adjusting nut engaging said bearing retainer means when an axial force is applied, in opposition to said resilient means, to said slack adjusting means and it is in its rigid condition, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth, a cam bar longitudinally movably mounted within the housing, a cam bar hub for engaging an abutment disposed within the housing for preventing excessive movement in the direction away from said one end of said housing, said cam bar hub being pinned to said cam bar, said cam bar hub having a circumferential shoulder, said other end of the trigger cable being threadably connected to said cam bar hub, said cable extending to an opening in the end of the housing and being adapted for longitudinal movement with respect to said housing, an end flange mounted on said housing adjacent said opening, a cable casing protecting said cable outside of said housing, a cable casing coupling attaching said cable casing to said end flange adjacent said opening, and resilient means disposed within the housing and acting between the cam bar hub shoulder and the end flange for urging the cam bar hub towards the second end of said housing.

11. A slack adjusting device comprising a housing having first and second ends; a push rod assembly having a threaded portion and having a circumferential shoulder; an adjusting nut threadably mounted on the threaded portion of said push rod and being provided with teeth on the circumference thereof; bearing means for mounting said adjusting nut within the housing for rotation, bearing retainer means for said bearing means, spring means disposed within the housing and acting between said circumferential shoulder and said bearing retainer means, said adjusting nut engaging said bearing retainer means when an axial force is applied to said slack adjusting means and it is in its rigid condition, a load pawl and a holding pawl mounted in said housing adjacent said teeth and engageable respectively with opposite sides of the teeth for respectively preventing movement of said push rod assembly in opposite directions, means engaging said pawls for moving said pawls into engagement with said teeth; a cam bar longitudinally movably mounted within the housing, a cam bar hub connected to said cam bar, said cam bar hub having a circumferential shoulder, a trigger cable threadably connected to said cam bar hub, said cable extending through an opening in the end of the housing and being adapted for longitudinal movement with respect to said housing, an end flange mounted in said housing adjacent said opening, said cam bar being U-shaped and the ends of the arms being cam surfaces respectively, said cam surfaces being engageable with said pawl cam engaging portions respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and said holding pawl is in engagement with one of said teeth, in a second longitudinal position of the cam bar said load pawl is in engagement with one of said teeth and said holding pawl is out of engagement with said teeth; and spring means within the housing acting between the circumferential shoulder of the cam bar hub and said end flange for urging the cam bar away from said first end of the housing.

12. A slack adjusting device comprising a housing having first and second ends; a push rod assembly having a threaded portion and having a circumferential shoulder; an adjusting nut threadably mounted on the threaded portion of said push rod and being provided with teeth on the circumference thereof; bearing means for mounting said adjusting nut within the housing for rotation, bearing retainer means for said bearing means, spring means disposed within the housing and acting between said circumferential shoulder and said bearing retainer means, said adjusting nut engaging said bearing retainer means when an axial force is applied to said slack adjusting means and it is in its rigid condition, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; and said holding pawl is in engagement with one of said teeth, in a second longitudinal position of the cam bar said load pawl is in engagement with one of said teeth and said holding pawl is out of engagement with said teeth; spring means within the housing acting between the circumferential shoulder of the cam bar hub and said end flange for urging the cam bar away from said first end of the housing.

13. A slack adjusting device comprising a housing having first and second ends; a push rod assembly having a threaded portion, a coupling portion, and a yoke portion, said portions being fixedly interconnected one with respect to the other and said threaded portion and said coupling portion being disposed within said housing and the yoke portion extending from said first end of the housing; said coupling portion having a circumferential shoulder, said housing having an internal shoulder; spring means disposed within the housing and acting between the housing shoulder and the coupling portion shoulder of said push rod assembly for urging the threaded portion toward said first end of the housing; an adjusting nut threadably mounted on the threaded portion of said push rod and being provided with teeth on the circumference thereof; means mounting said adjusting nut within said housing for rotation, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth; a cam bar longitudinally movably mounted within said housing; a cam bar hub fixedly connected to said cam bar, said cam bar hub having a circumferential shoulder, a trigger cable fixedly connected to said cam bar hub, said cable extending through an opening in the end of the housing and being adapted for longitudinal movement with respect to said housing, an end flange mounted in said housing adjacent said opening, a cable casing protecting said cable outside of said housing, said casing being attached to said end flange adjacent said opening, said cam bar being U-shaped, means engaging said pawls for moving said pawls into engagement with said teeth; a cam bar longitudinally movably mounted within the housing, a cam bar hub for engaging an abutment disposed within the housing for preventing excessive movement in a direction away from said first end of said housing, said cam bar hub being pinned to said cam bar, said cam bar hub having a circumferential shoulder, a trigger cable threadably connected to said cam bar hub, said cable extending thru an opening in the end of the housing and being adapted for longitudinal movement with respect to said housing, an end flange mounted in said housing adjacent said opening, a cable casing protecting said cable outside of said housing, a cable casing coupling attached to said cable housing. and said end flange adjacent said opening, said cam bar benig U-shaped and the ends of the arms being cam surfaces respectively, said cam surfaces being engageable with said pawl cam engaging portions respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and the ends of the arms being cam surfaces respectively, said cam surfaces being engageable with said pawl cam engaging portions respectively for disengaging the teeth engaging portions of said pawls from said teeth, said cam surfaces and said cam engaging portions being disposed with respect to said pawls so that in a first longitudinal position of the cam bar the load pawl is out of engagement with the teeth and the holding pawl is in engagement with one of said teeth, in a second longitudinal position of said cam bar the load pawl is in engagement with one of said teeth and the holding pawl is out of engagement with said teeth; and spring means within the housing acting between the circumferential shoulder of the cam bar hub and said end flange for urging the cam bar away from said first end of the housing.

14. A slack adjusting device comprising a housing having first and second ends; a push rod assembly having a threaded portion, a coupling portion, and a yoke portion, said portions being fixedly interconnected one with respect to the next adjacent one and said threaded portion and said coupling portion being disposed within said housing and said yoke portion extending from said first end of the housing; said coupling portion having a circumferential shoulder, said housing having an internal shoulder; spring means disposed within the housing and acting between the housing shoulder and the coupling portion shoulder of said push rod assembly for urging said threaded portion toward said first end of the housing; an adjusting nut threadably mounted on the threaded portion of said push rod and being provided with teeth on the circumferenec thereof; bearing means for mounting said adjusting nut within the housing for rotation, bearing retainer means for said bearing means, resilient means for resiliently separating said adjusting nut and said retainer means, said adjusting nut engaging said bearing retainer means when an axial force is applied, in opposition to said resilient means, to said slack adjusting means and it is in its rigid condition, means for limiting the axial travel of said adpusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth; a cam bar longitudinally movably mounted within the housing, a cam bar hub for engaging an abutment disposed within the housing for preventing excessive movement in a direction away from said one end of said housing, said cam bar hub being pinned to said cam bar, said cam bar hub having a circumferential shoulder, a trigger cable threadably connected to said cam bar hub, said cable extending through an opening in the end of the housing and being adapted for longitudinal movement with respect to said housing, and end flange mounted in said housing adjacent said opening, a cable casing protecting said cable outside of the housing, a cable casing coupling attaching said cable casing to said end flange adjacent said opening, said cam bar being U-shaped and the ends of the arms being cam surfaces respectively, said cam surfaces being engageable with said pawl cam engaging portions respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and said holding pawl is in engagement with one of said teeth, in a second longitudinal position of the cam bar said load pawl is in engagement with one of said teeth and said holding pawl is out of engagement with said teeth; and spring means within the housing acting between the circumferential shoulder of the cam bar hub and said end flange for urging the cam bar away from said first end of the housing.

References Cited
UNITED STATES PATENTS

| | | | |
|---|---|---|---|
| 3,040,844 | 6/1962 | Holloway et al. | 188—200 |
| 3,283,861 | 11/1966 | Mersereau | 188—202 |
| 3,335,825 | 8/1967 | Mersereau et al. | 188—195 |

DUANE A. REGER, *Primary Examiner.*